United States Patent [19]

Binder et al.

[11] Patent Number: 4,543,305
[45] Date of Patent: Sep. 24, 1985

[54] METHOD OF PRETREATING CARBON BLACK POWDER TO IMPROVE CATHODE PERFORMANCE AND LITHIUM SULFURYL CHLORIDE CELL INCLUDING THE PRETREATED CARBON BLACK POWDER

[75] Inventors: Michael Binder, Brooklyn, N.Y.; Charles W. Walker, Jr., Freehold, N.J.; Eric R. Petersen, Manchester, N.J.; William L. Wade, Jr., Neptune, N.J.; Sol Gilman, Rumson, N.J.

[73] Assignee: The United States of America as represented by the Secretary of the Army, Washington, D.C.

[21] Appl. No.: 715,808

[22] Filed: Mar. 25, 1985

Related U.S. Application Data

[62] Division of Ser. No. 544,770, Oct. 24, 1983, Pat. No. 4,526,881.

[51] Int. Cl.[4] ............ H01M 4/96; H01M 6/14
[52] U.S. Cl. .................... 429/101; 429/196; 429/218; 423/460
[58] Field of Search ............. 429/101, 196, 218, 209; 423/460

[56] References Cited

U.S. PATENT DOCUMENTS

| | | | |
|---|---|---|---|
| 4,367,266 | 1/1983 | Kalnoki-Kis | 429/101 |
| 4,461,814 | 7/1984 | Klinedinst | 429/196 |
| 4,474,863 | 10/1984 | Behl | 429/101 |
| 4,514,478 | 4/1985 | Binder et al. | 429/218 |

Primary Examiner—Donald L. Walton
Attorney, Agent, or Firm—Anthony T. Lane; Jeremiah G. Murray; Roy E. Gordon

[57] ABSTRACT

Carbon black powder is pretreated with acetone or methanol prior to cathode fabrication to improve the cathode operating voltage and increase the cathode life of lithium sulfuryl chloride electrochemical cells.

6 Claims, 2 Drawing Figures

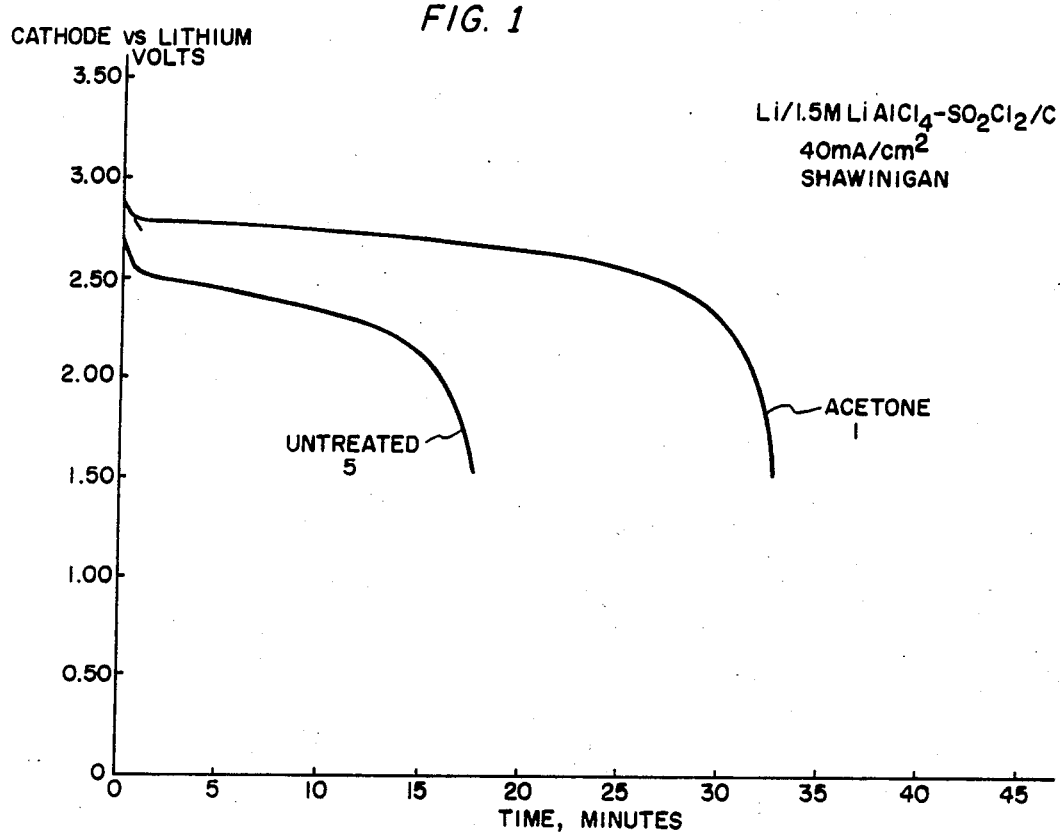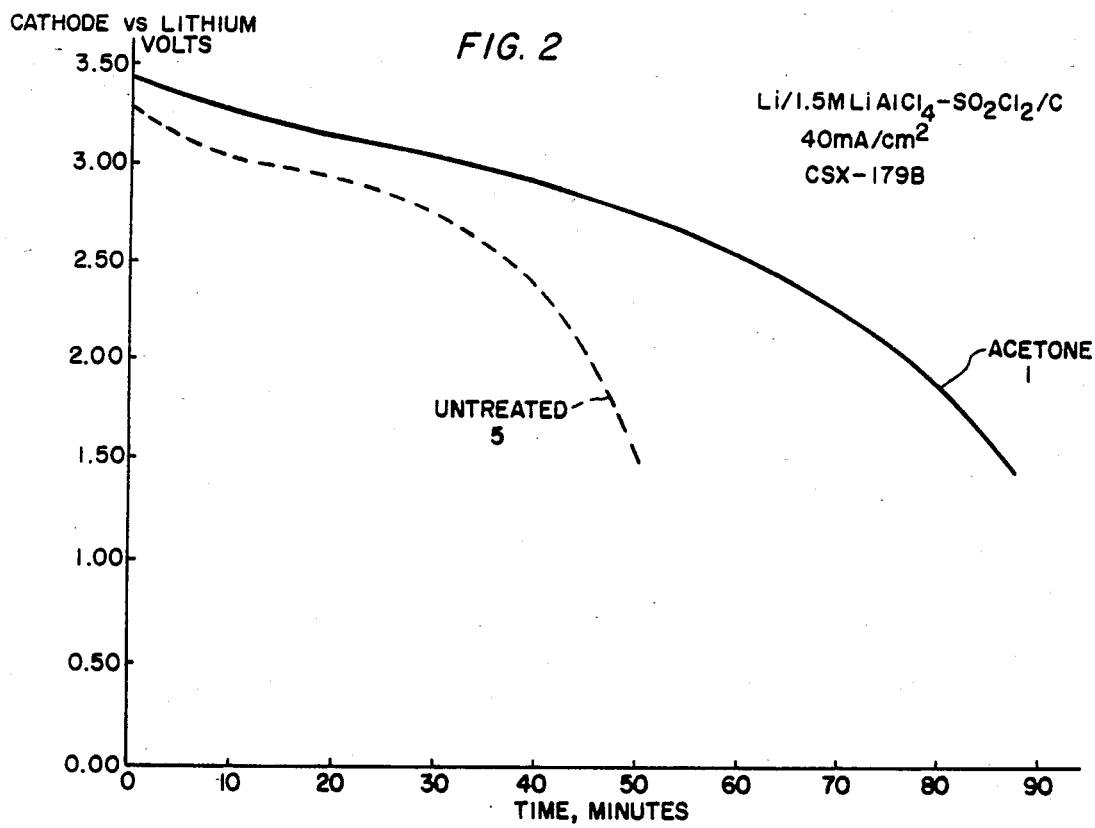

METHOD OF PRETREATING CARBON BLACK POWDER TO IMPROVE CATHODE PERFORMANCE AND LITHIUM SULFURYL CHLORIDE CELL INCLUDING THE PRETREATED CARBON BLACK POWDER

The invention described herein may be manufactured, used, and licensed by or for the Government for governmental purposes without the payment to us of any royalty thereon.

This invention relates in general to a method of pretreating a carbon black powder prior to cathode fabrication to improve cathode performance and in particular to a lithium sulfuryl chloride electrochemical cell including the pretreated carbon black powder.

This application is a division of application Ser. No. 544,770, filed Oct. 24, 1983, now U.S. Pat. No. 4,526,881.

The lithium-sulfuryl chloride ($Li/SO_2Cl_2$) cell has been a subject of research and development investigation for the last ten years because of its potentiality for high voltage and capacity as an ambient temperature primary cell with improved safety characteristics. This system, with its high gravimetric and volumetric energy density is a desireable power source for military applications requiring high energy density, extremely long shelf life and/or discharge time and are being tested presently for such applications.

The cell basically is comprised of a lithium foil anode, a conducting $SO_2Cl_2$ electrolyte solution as for example 1.5 M $LiAlCl_4$—$SO_2Cl_2$ and an inert porous carbon based cathode fabricated by bonding carbon black powder to a support nickel matrix using about 5 to 10 percent of Teflon as the binding agent.

Cathodes for other lithium battery systems such as lithium thionyl chloride ($Li/SOCl_2$) are normally formulated with Shawinigan acetylene carbon black, a low surface area carbon black of 60 $m^2/g$, and achieve satisfactory performance. However, similarly constructed cathodes when studied in $Li/SO_2Cl_2$ cells produce rather discouraging results in terms of reduced operating voltages and capacities.

In $Li/SO_2Cl_2$ cells, overall cell operating life in both room temperature and low temperature applications is primarily limited by the reduction process occurring at the Teflon-bonded carbon cathode. The carbon cathode must accommodate LiCl formed during cell discharge while allowing continued transport of cathode reactants and conducting ions. When the cathode becomes clogged by LiCl deposits, it can no longer allow sufficient transport of ions and it polarizes severely thereby reducing effective operating cell voltage and causing premature cell failure. There is yet another particularly interesting feature of the $Li/SO_2Cl_2$ system. Sulfuryl chloride undergoes a thermally activated catalytic decomposition to yield $SO_2$ and $Cl_2$, both of which are soluble in $SO_2Cl_2$. However, since molecular $Cl_2$ is more reactive than the undissociated parent $SO_2Cl_2$, it operates at higher potentials thereby contributing to increased operating voltage.

Since carbon is a well-known catalyst for the above reaction, high electrode surface area is important in terms of achieving high operating cell voltage.

However, mixability and wettability of high area carbon blacks with water and a suitable Teflon binder such as Teflon 30 is not particularly good. The resulting cathodes formed are not structurally sound and tend to crumble rather easily under mechanical shock. Because of these problems, state of the art cathodes for these cells have been constructed with low surface area carbon blacks that produce cathodes of good mechanical adhesion and structural rigidity although with substantially reduced catalytic activity. The resulting poorer voltage performance in cells constructed with these low area carbon blacks has necessitated doping the cathodes or electrolyte solution with additions of such materials as $Cl_2$, expensive conducting precious metal catalysts such as platinum, addition of heterogeneous and homogeneous electrocatalysts in the form of transition metal complexes of macrocyclic compounds such as cobalt and iron tetraazaannulenes and cobalt and iron phthalocyanines. Long term stability or safety implications of these additives in full cells have yet to be investigated.

SUMMARY OF THE INVENTION

The general object of this invention is to provide a method of pretreating a carbon black powder prior to cathode fabrication to improve cathode operating voltages and increase cathode life. A more specific object of the invention is to provide such a method that does not involve the use of chemical additives whose chemical consequences are complex and in general, unknown. A still further object of the invention is to provide such a method that will result in a cathode suitable for use in a lithium sulfuryl chloride cell.

It has now been found that the aforementioned objectives can be attained by pretreating the carbon black powder with a suitable wetting solvent such as acetone or methanol prior to cathode fabrication.

More specifically an inexpensive pretreatment procedure has now been found that can be applied to the carbon black prior to cathode fabrication that improves eventual cathode operating voltages by approximately 0.25 V and increases cathode life by 100%. There are no potentially unsafe or costly chemicals that need to be added to the cell electrolyte.

The treatment comprises wetting the carbon black powder by adding the carbon black directly to a beaker containing acetone or another suitable wetting solvent. After sufficient mixing and wetting has occurred, the carbon black-acetone mixture is filtered through a Buchner funnel fitted with filter paper, rinsed with an excess of water and dried overnight in a vacuum oven at 100° C. The resulting dried carbon black is fabricated into cathodes and compared to cathodes fabricated from untreated carbon black in an identical manner.

Shawinigan acetylene black is the first carbon black to be chosen for the comparison as it is one of the most widely used carbon blacks used in fabricating cathodes.

DESCRIPTION OF THE DRAWING AND THE PREFERRED EMBODIMENT

FIG. 1 shows constant current discharge curves for carbon cathodes in Li/1.5 M $LiAlCl_4$—$SO_2Cl_2$ cells fabricated from Shawinigan acetylene black with and without acetone pretreatment.

FIG. 2 shows constant current discharge curves for carbon cathodes in Li/1.5 M $LiAlCl_4$—$SO_2Cl_2$ cells fabricated from a high surface area carbon, CSX-179B carbon black with and without acetone pretreatment.

Referring to FIG. 1, best performance in terms of high operating load voltages and cathode capacity appears to be obtained for cathode constructed with acetone pretreated carbon blacks.

In fact, cathodes fabricated with the pretreated carbon black have capacities comparable to cathodes fabricated with high surface area carbon.

This result is entirely unexpected. It would not be expected that a relatively mild room temperature treatment with a fairly volatile substance that is subsequently removed could effect as dramatic a change in cathode performance. In general, vigorous reduction or oxidation at temperatures in excess of 750° C. is required in order to oxidize or reduce surface chemical groups.

In order to determine whether this observed improvement could be peculiar to Shawinigan acetylene black, similar experiments were performed on a high surface area carbon CSX-179B with a surface area of 1500 $m^2/g$ and the results are shown in FIG. 2. It is clear that substantial improvements are achieved by simple treatment. Again the improvements are unexpected since the two carbons tested differ substantially in surface area, pH, ash content and percent impurity.

It is thus evident that pretreatment of both Shawinigan acetylene black and CSX-179B with acetone subsequently yielded cathodes that showed marked improvements in both operating voltages and capacities over untreated baseline cathodes.

This pretreatment method of the invention is considered to be applicable to any battery or fuel cell system where carbon black is used as an electrode material.

We wish it to be understood that we do not desire to be limited to the exact details as described for obvious modifications will occur to a person skilled in the art.

What is claimed is:

1. A lithium sulfuryl chloride electrochemical cell including polytetrafluoroethylene bonded carbon cathodes and having an improved cathode operating voltage and an increased cathode life, said improvements being obtained by pretreating the carbon black powder with acetone prior to cathode fabrication.

2. A lithium sulfuryl chloride electrochemical cell according to claim 1 wherein the carbon black powder is a low surface area carbon black powder.

3. A lithium sulfuryl chloride electrochemical cell according to claim 2 wherein the carbon black powder is a high surface area carbon black powder.

4. A lithium sulfuryl chloride electrochemical cell including tetrafluoroethylene bonded carbon cathodes, and having an improved cathode operating voltage and an increased cathode life, said improvements being obtained by pretreating the carbon black powder with acetone prior to cathode fabrication, filtering the carbon black-acetone mixture through a Buchner funnel fitted with a filter paper, rinsing with an excess amount of water and drying overnight in a vacuum oven at about 100° C.

5. A lithium sulfuryl chloride electrochemical cell according to claim 4 wherein the carbon black powder is a low surface area carbon black powder.

6. A lithium sulfuryl chloride electrochemical cell according to claim 4 wherein the carbon black powder is a high surface area carbon black powder.

* * * * *